(12) United States Patent
Corby

(10) Patent No.: US 9,076,024 B2
(45) Date of Patent: Jul. 7, 2015

(54) ANTI-COUNTERFEITING SYSTEM AND METHOD

(71) Applicant: Stuart Douglas Corby, Sai Ying Pun (HK)

(72) Inventor: Stuart Douglas Corby, Sai Ying Pun (HK)

(73) Assignee: Authentag, LLC, McLean, VA (US)

( * ) Notice: Subject to any disclaimer, the term of this patent is extended or adjusted under 35 U.S.C. 154(b) by 0 days.

(21) Appl. No.: 13/789,261

(22) Filed: Mar. 7, 2013

(65) Prior Publication Data

US 2014/0252077 A1 Sep. 11, 2014

(51) Int. Cl.
*G06F 17/00* (2006.01)
*G06K 15/00* (2006.01)
*G06K 5/00* (2006.01)

(52) U.S. Cl.
CPC ........................................ *G06K 5/00* (2013.01)

(58) Field of Classification Search
CPC .. G07F 7/086; G06Q 20/3674; G06Q 30/012; G06Q 30/016; G06Q 30/018; G06Q 30/0185; G06F 21/44; G06K 5/00
USPC ...................... 235/375, 383, 385, 462.01, 494
See application file for complete search history.

(56) References Cited

U.S. PATENT DOCUMENTS

| | | | |
|---|---|---|---|
| 6,039,249 A | 3/2000 | Szewczykowski | |
| 2008/0179390 A1* | 7/2008 | Harjani | 235/375 |
| 2012/0187185 A1* | 7/2012 | Sayan | 235/375 |
| 2012/0234908 A1* | 9/2012 | Wang et al. | 235/375 |
| 2012/0280043 A1 | 11/2012 | Roseman | |
| 2013/0015236 A1* | 1/2013 | Porter et al. | 235/375 |
| 2013/0082108 A1* | 4/2013 | Lawandy | 235/462.09 |
| 2013/0151861 A1* | 6/2013 | Gan | 713/189 |
| 2014/0008429 A1* | 1/2014 | Wang et al. | 235/375 |

* cited by examiner

*Primary Examiner* — Tuyen K Vo
(74) *Attorney, Agent, or Firm* — Jaquez Land Richman LLP; John Land, Esq.

(57) ABSTRACT

In an anti-counterfeiting system and method, a set of identification codes are generated from data associated with units of a line of items. A manufacturer affixes machine readable forms of such identification codes to units of an item, and scans or reads the affixed identification codes before distribution of the units in order to flag only affixed identification codes as "active". Thereafter, when a user scans or reads the machine readable form of an affixed identification code from a unit of some item, such as by using a "smart phone", the identification code value is transmitted for verification and validation, and subjected to selected computer based tests to determine the authenticity of the identification code and thus of the associated unit. The user is provided with feedback as to the genuineness of the unit, or is contacted by or directed to contact a representative of the manufacturer if doubt exists.

21 Claims, 3 Drawing Sheets

ANTI-COUNTERFEITING SYSTEM AND METHOD

BACKGROUND

This invention relates to anti-counterfeiting systems and methods, and more particularly to a system and method for uniquely identifying items so as to be able to distinguish genuine items from counterfeit versions.

Counterfeiting of items such as goods, materials, and documents defrauds consumers, tarnishes the brand names of legitimate manufacturers and providers of such items, and can endanger public health (for example, when adulterated foods and drugs are passed off as genuine). Counterfeiting is a hugely lucrative business, with criminals relying on the continued high demand for cheap goods coupled with low production and distribution costs. While the costs are difficult to quantify—and do not include non-monetary damage such as illness and death—the value of counterfeiting was estimated in 2009 by the Organization for Economic Cooperation and Development to be in the region of $250 billion per year. In a real sense, such counterfeiting imposes an invisible tax on world trade.

Anti-counterfeiting measures have included serial numbers, machine readable identifiers (e.g., scannable barcodes and two-dimensional codes), "tamper-proof" security labels (e.g., holograms and labels that change state or partly or completely self-destruct on removal), and remotely detectable tags (e.g., radio-frequency identification tags) applied to items directly or to tags, labels, and/or packaging for such items. However, such measures have themselves been counterfeited. Further, in light of such counterfeiting, consumers generally have been unable to rely upon such measures in order to verify the authenticity of marked or tagged items.

Accordingly, there is a need for a system for uniquely identifying items so as to be able to distinguish genuine items from counterfeit versions and which provides a means for consumers and other users to verify the authenticity of marked or tagged items.

SUMMARY

Unique identification codes, preferably a set of hash codes generated from data associated with units of a line of products or other items by applying a suitable hash function, are generated. A hash function is any algorithm or subroutine that maps large data sets of variable length to smaller data sets of a fixed length. The identification codes are provided to a manufacturer as machine readable labels, tags, devices, or the like, or provided as a data set for local conversion by the manufacturer into machine readable form. Alternatively, a service provider may ship machine readable (and preferably tamper resistant) labels, tags, or the like bearing such identification codes to the manufacturer. The manufacturer affixes the machine readable identification codes to units of an item, and scans the affixed identification codes before distribution of the units in order to flag each affixed identification code as "active".

Thereafter, when a consumer or other user scans a machine readable form of an affixed identification code from a unit of some item, the identification code value is transmitted along with any desired auxiliary information (e.g., user identity, location, telephone number, etc.) to the manufacturer or to a service provider, which performs selected verification and validation tests to determine the authenticity of the identification code, and thus of the associated unit. The consumer or user is provided with feedback as to the genuineness of the unit, or is contacted by or directed to contact a representative of the manufacturer if doubt exists.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1A:
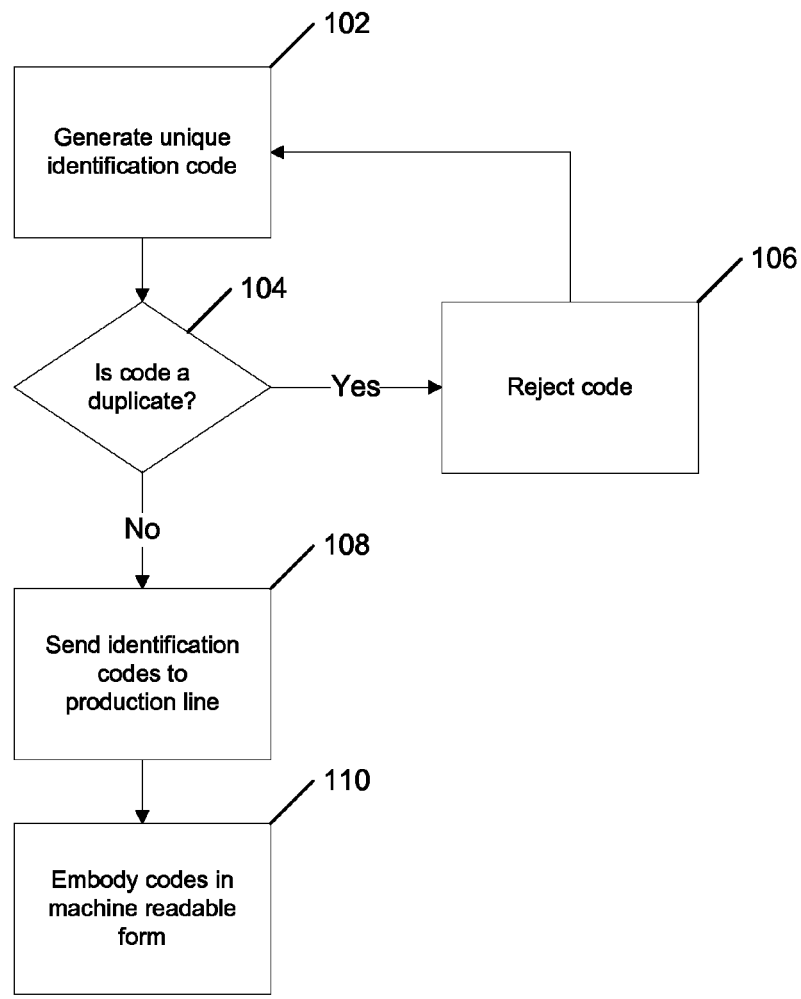
FIGS. 1A and 1B show a flow chart of the production side of one embodiment of an anti-counterfeiting system in accordance with the invention.
Figure 1B:
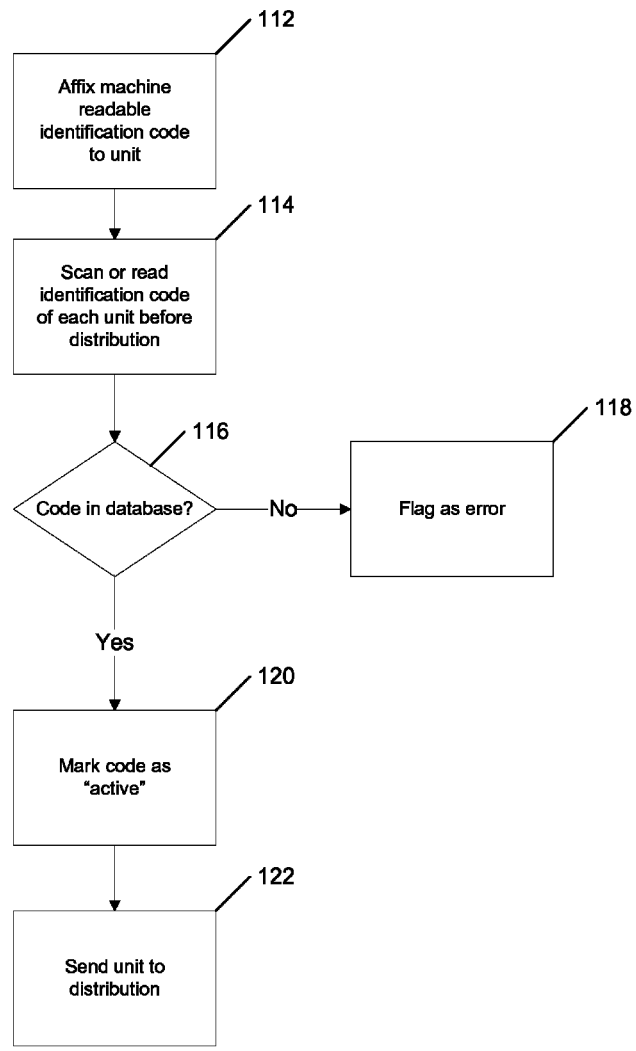

FIGS. 1A and 1B show a flow chart the production side of one embodiment of an anti-counterfeiting system in accordance with the invention. For each item to be marked, a unique identification code is generated by a computer program (step 102). This identification code preferably comprises a hash code computed from data arbitrarily assigned to the item (for example, a random number), or from data specifically about the item, such as the manufacturer's name or other identification, a model number, a lot number, a serial number, the date of manufacture, the address or location information for a factory producing the item, and/or any other desirable information. As is known in the art, a hash code is generated by applying a suitable hash function that maps large data sets of variable length to smaller data sets of a fixed length. One or more computer databases are maintained of the input data used to derive the identification codes, and of the corresponding identification codes.

For example, the following data fields in Table 1 may by associated with a single unit of a luxury purse line of goods:

TABLE 1

| | |
|---|---|
| Manufacturer | Venus de Milo Accessories |
| Model Number | 1010 |
| Model Name | Persephone |
| Lot Number | 501 |
| Factory ID | Hong Kong |
| Date of Manufacture | Feb. 14, 2015 |
| Serial Number | 1001001 [varies per unit] |
| <other desired fields> | <corresponding data> |
| Hash Code | <to be generated> |

The data associated with a single purse (for example, the purse having serial number 1001001) can be hashed using any convenient hashing function, such as the well known Fowler-Noll-Vo hash function, programmed for execution on a computer. For even greater security, an encrypting hashing function can be used, such as the well known SHA-2 or SHA-3 families of algorithms. An encrypting hashing function has at least the characteristic that it is infeasible to generate the original data from a known hash code. In any case, the selected hashing function preferably has the characteristic that it is highly unlikely for two different data records to have the same hash code.

The output of the hashing function is a number (for example, a 256 bit or 1024 bit number) that can be saved in a computer data record for the corresponding unit, or in a separate record associated with the data record for the corresponding unit. Note that even if sequential unit numbers are used and all other data fields are identical, the hashing function will in general generate non-sequential (i.e., seemingly random) hash codes.

It may not be known in advance what serial numbers are to be identified with identification codes generated as described above. Further, generating identification codes associated with specific unit numbers in advance of affixing such identification codes to the actual corresponding units would require careful monitoring during the manufacturing or packaging process. Accordingly, it is preferable to computer generate a set of identification codes (for example, 10,000) based on data associated with the item to be marked along with a random number arbitrarily assigned to each unit (rather than a specific serial number per unit). Using random numbers, an encrypting hashing function will in general generate non-sequential (i.e., essentially random) hash codes, lacking any readily apparent distribution pattern. Further, by using a large hash code value (e.g., 512 or 1024 bits), the number of possible hash codes is enormous (e.g., $2^{512}$ or $2^{1024}$), so an essentially random distribution of 10,000 or even millions of hash codes will utilize only a small number of the possible hash code values. The invention provides a means for uniquely associating one of such hash code values with a specific unit of an item as an identification code, as described below.

Once a hash code or set of hash codes is generated, it is useful to test for duplicate values (step 104), since it is theoretically possible that identical hash codes may be generated from different sets of input values. Any convenient programmatic means may be used for comparison of a generated hash code against the stored values of all previously generated hash codes for the units of an item, or for all units of all items. If a generated hash code is a duplicate, then it is rejected (step 106) and a replacement hash code is generated (step 102), using a new random number for example. If the possibility of a "collision" of hash values is deemed to be acceptably low (for example, by using large random numbers to designate units of an item), or the consequences of having a collision are acceptable (if, for example, missing a counterfeit item on rare occasions is acceptable to a manufacturer), testing for duplicate values may be omitted.

Once a set of identification codes for units of an item has been generated, the set may be sent to a production line for the item, such as by electronic transfer or forwarding a data storage device (step 108). Depending on the manufacturer's needs and/or manufacturing process, each identification code is then embodied in a suitable a machine readable form, such as an electronic encoding device (for example, a radio-frequency identification (RFID) or near-field communication device) or optically readable form (for example, as a barcode, or a two-dimensional "quick recognition" code of the type described in U.S. Pat. No. 5,726,435, or variants of such encoding schemes) (step 110). For many consumer products, a visibly printed quick recognition code is quite useful, since such codes can represent hundreds to thousands of characters of data and can be readily scanned with camera-equipped "smart phones", as described below. In some cases, a manufacturer may wish to print a machine readable code in an ink or material that may only be seen under non-visible wavelengths of light (e.g., UV light), so as to not advertise the existence of such a code to potential counterfeiters. This may be useful, for example, for commercial components (e.g., electronic parts) in business to business commerce, where recipients can set up intake manual or automatic scanning systems to verify the authenticity of components.

The machine readable form of the identification code (from step 110) may be directly integrated with units of an item (e.g., printed, molded, cut, or etched on a bottle). Otherwise, the machine readable form may be affixed (e.g., applied, inserted, embedded, printed, etc.) within, on, or to units of the item or labels or packaging for such units such that the machine readable form is accessible to a suitable scanning device (e.g., an optical scanner where the machine readable form is a barcode or quick recognition code, or a radio frequency scanner where the machine readable form is an RFID or near field communication device) (step 112). For extra security, the machine readable identification code physical formats may be made tamper resistant, such as by using tamper resistant holograms or printed labels that change state or partly or completely self-destruct on removal.

At this point in the process, a unique identification code is associated with a specific unit of an item. For example, for powdered milk, each box of the product could be printed with a quick recognition code representing a unique identification code. Similarly, for luxury watches each bearing a unique serial number, the package for each unit of the watch could include an attached RFID tag embodying a unique identification code. However, as noted above, unless careful monitoring occurs during the manufacturing or packaging process, an identification code intended for a specific unit may not in fact be affixed to such unit. Accordingly, a preferred embodiment of the invention dispenses with such pre-affixation monitoring. Instead, each instance of a machine readable identification code is scanned just before affixation or after affixation to a unit of an item (step 114). Thus, for example, as bottles of wine printed with a quick recognition code representing a unique identification code are positioned to be placed into larger cases for distribution, each quick recognition code is optically scanned, either manually or automatically (e.g., as a bottle moves down a conveyor line). A worker could even scan the quick recognition code using a pre-authorized personal "smart phone", as described below. As another example, a label bearing an identification code can be scanned just before the label is attached to or applied to a unit. In any event, such scanning is preferably done in close proximity to the time of affixation of the machine readable identification code, preferably no more than a few minutes before or after affixation.

An advantage of allowing only authorized devices, such as "smart phones", to scan identification codes is that a manufacturer can further control security with respect to the manufacture of items and the verification and validation of identification codes. Such a device may be authorized by associating a unique user identification code ("user ID") with the device and recording that user ID in a suitable computer database. The user ID may be simply the telephone number of a "smart phone", but is preferably an encrypted hash code based on one or more data characteristics of the device, such as user name or other user identification, telephone number, internet protocol address, model number, serial number, International Mobile Station Equipment Identity number, Integrated Circuit Card Identifier number, etc. The user ID is transmitted, along with a scanned machine readable identification code, to be used as a look-up value to a database of authorized users; unauthorized users may be ignored or sent a message indicating that their scanning device is unauthorized. If desired, either or both of a scanned machine readable identification code and a user ID may be encrypted before transmission from a scanning device using the public key of a public-private key encryption system maintained by or for a manufacturer. The manufacturer (or a service provider on behalf of the manufacturer) can decrypt the encrypted information using a private key, in known fashion. Such encryption further enhances security by helping to prevent "hacking" by third parties.

A scanned machine readable identification code value is transmitted to a computer programmed to compare that value to a database associated with the item line, where such database includes at least the possible identification codes assigned to the item line, along with the original data from which the identification codes were generated (step 116). If the scanned code value does not exist in the database, either an error has occurred in the scanning process, or a counterfeit identification code has been applied, or the wrong set of identification codes for that item line has been used (e.g., identification codes intended for one product line were applied on units of a different product line). In any event, the mismatch is flagged as an error (step 118), and notice is sent to the production line, where the manufacturer may take any desired corrective action.

If the scanned identification code for a unit of an item exists in the associated database, the identification code record for the unit is marked with a selected status, such as "active" (the default value being "inactive" or "unused" or the like) (step 120), and the unit may be sent out for distribution through the manufacturer's chain of distribution (step 122).

Significant advantages of post-affixation scanning include positive recognition of only those identification codes in actual use; the ability to deactivate an affixed identification code if needed (for example, if a unit is being scrapped); and the ability to replace (for example, by relabeling or repackaging) an affixed identification code with another identification code if needed (for example, if a unit is being re-purposed).

In an alternative embodiment, unique machine readable identification codes may be affixed to units of an item anywhere in the various stages of manufacture, and activated by scanning as described above well before final pre-distribution packaging. This approach would allow a manufacturer to use the affixed identification codes as part of its manufacturing control and quality control (QC) processes. For example, if a unit of a product fails a QC test, the machine readable identification code for the unit can be scanned by a worker (for example, by using a previously authorized "smart phone") or by an automated facility (for example, a scanner on a reject pathway of a conveyor system). The scanned value of the affixed identification code can be used to look up a corresponding database record for the unit, which is then flagged as "failed" or the like so that any subsequent scan of the same machine readable identification code will result in an alert to the manufacturer. Thus, if a rejected unit does surreptitiously enter into commerce, a scan of its affixed machine readable identification code will disclose the rejected status.

In addition, an affixed machine readable identification code can be scanned anywhere along the chain of distribution, and location and other information may be transmitted back to be recorded in a corresponding computer database. For example, the identification codes affixed to each unit of a shipment of designer luggage manufactured in Hong Kong and shipped to a distributor in Australia can be scanned by the distributor upon receipt, and the corresponding database records for those units can be updated to indicate "Australia" as the current location.

Figure 2:
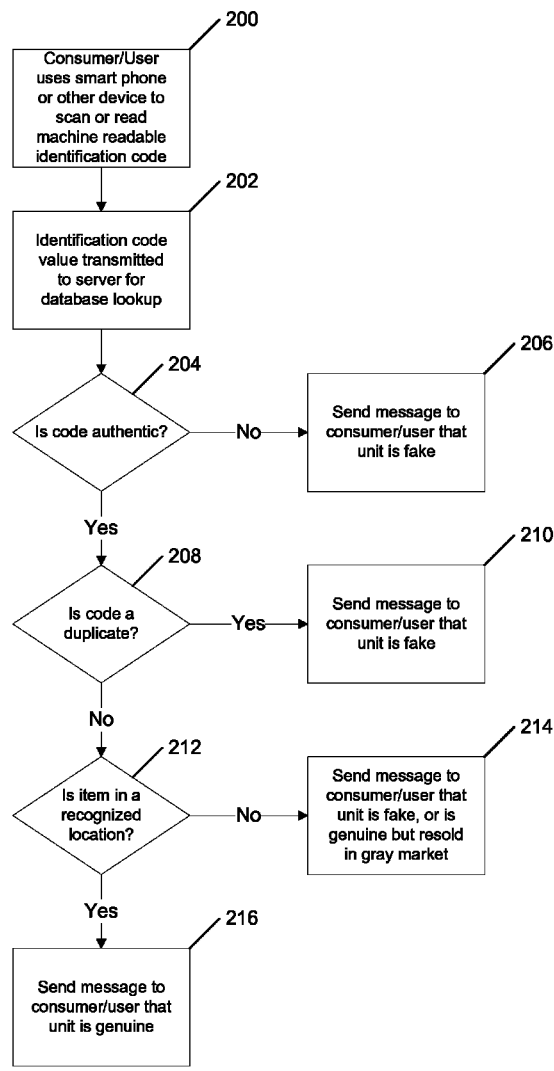
FIG. 2 is a flow chart showing the consumer side of one embodiment of an anti-counterfeiting system in accordance with the invention.

FIG. 2 is a flow chart showing the consumer side of one embodiment of an anti-counterfeiting system in accordance with the invention. The machine readable identification code affixed to a unit of an item as described with respect to FIGS. 1A and 1B can be machine scanned or by a consumer or other user to determine if the item is genuine (step 200). For example, if the affixed machine readable identification code is a quick recognition code, a consumer can use a camera-equipped "smart phone" and a suitable application to capture an image of the quick recognition code. The application analyzes the image of the quick recognition code in known fashion to derive the identification code encoded by the quick recognition code. In any case, the value of the scanned identification code is then transmitted to a server for comparison to a computer database of identification codes (step 202). In addition, the transmitted data may include such items as the consumer's name, telephone number, email address, social media account, and/or geographic location, much of which is typically available through a "smart phone" operating system, or a user ID of the type described above, either in "plain text" form or encrypted form. Such information is useful to a manufacturer to assess whether or not the consumer is actually a potential counterfeiter probing ways to "break" or bypass the anti-counterfeiting system, and may also be useful for assessing consumer shopping patterns for marketing purposes. As an alternative to including such identifying information with transmittal of the scanned identification code, a consumer or other user may instead be directed to log into an internet web site where such identifying information has already been disclosed (for an existing user account) or must be disclosed (to set up a user account) before the authenticity of the unit in question will be determined.

The transmitted identification code is compared to a computer database of known identification codes to verify the transmitted identification code for authenticity (step 204). For example, the identification code may be used as a look-up key value to the database, which retrieves an associated data record. If the associated data record discloses that the identification code was not flagged as "active" as described above, and is thus not authentic, a return message is sent to the consumer or user that the code (and thus the associated unit) is non-authentic or fake (step 206). This case may occur, for example, where a counterfeiter has mimicked the machine readable form of the identification code to make a unit of an item appear genuine. However, by utilizing a large hash code length (e.g., 512 bit), it is unlikely that a counterfeiter can simply pick an identification code value that in fact has been issued and has been flagged as "active".

In a preferred embodiment, the computer database is programmed to record a timestamp for each scan of a machine readable form of an affixed identification code, and to store the geographic location of each scan. If so, an authenticated transmitted identification code can be compared to the database to determine if that identification code has been scanned before and is an unauthorized duplicate (step 208), meaning that the code has been scanned previously in a location that is inconsistent with the location of the current scan (for example, where the current scan does not originate in an authorized retail store). If the identification code is a duplicate, a return message is sent to the consumer or user that the code (and thus the associated unit) is non-authentic or fake (step 210). This case may occur, for example, where a counterfeiter applies an authentic identification code (perhaps copied from a real unit) to a unit of an item known by the manufacturer to have been shipped to a different location.

Even if a transmitted identification code is authentic and has never before been scanned, it may still be a potential counterfeit. For example, a transmitted identification code can be compared against a computer database of identification codes to determine if the scan location is at or near a recognized location recorded in the database (step 212). If not, a manufacturer may elect to transmit a return message that the unit is possibly a fake, and that the consumer should contact the manufacturer for a better determination of the actual status of the unit (step 214). This case may occur, for example, where the scan of an identification code on a unit of an item indicates that the unit is currently located in a country different from the known intended destination for the unit (e.g., the machine readable form of the identification code affixed to a camera intended for distribution in Europe is being scanned in Canada; the identification code may be authentic and not a duplicate, but the location may indicate that the camera is being re-distributed through "gray market" or parallel channels of commerce, and thus may not be covered by the manufacturer's warranty).

If a transmitted identification code passes the applied verification and validation tests, a return message is sent to the consumer that the associated unit is genuine (step 216).

It should be readily apparent that the tests described above (steps 204, 208, and 212) can be done in a different order, can be supplemented by additional verification and validation tests, and may even be omitted in some cases (e.g., step 212 may be optional). For example, a manufacturer may want to notify a consumer that a particular unit of product (for example, food or drugs), while genuine, has passed its expiration date and thus should be discarded.

It should be appreciated that the present invention empowers a consumer to determine, on demand and before, at, or after the time of purchase, the authenticity of a unit of an item (e.g., food, goods, documents) marked with a machine readable identification code in accordance with the above teachings. Further, a manufacturer may elect to directly contact (such as by email, text message, telephone call, etc.) a consumer or other user after a scan of a machine readable identification code to explore any anomaly detected during the identification code verification and validation process, or simply for marketing purposes.

It may be a useful business model to implement the above inventive concepts by providing a suitably programmed identification code generator, associated computer database, and identification code verification and validation system to individual manufacturers. However, an alternative business model is to provide these functions as a service to multiple manufacturers. Thus, for example, each manufacturer may order a set of separate identification codes for units of one or more particular items (e.g., different watch or camera models) from a service provider, which records details about the manufacturer and about the items in a secure computer database. The service provider would generate a set of identification codes and transmit such identification codes to the manufacturer for local conversion into machine readable form. Alternatively, the service provider may ship to the manufacturer machine readable identification codes in the form of labels, tags, devices, or the like (preferably tamper resistant). The manufacturer would affix the machine readable identification codes to units of an item, as described above, and scan the identification codes before distribution of the units in order to flag each affixed identification code as "active" or the like.

Thereafter, when a consumer or other user scans a machine readable form of an affixed identification code from a unit of some item, the identification code value is transmitted to the service provider along with any desired auxiliary information (e.g., the user's identity, location, telephone number, etc.) or a user ID (as described above). The service provider would perform the verification and validation tests described above, or as may be additionally specified by a manufacturer, and provide a responsive message to the consumer. Alternatively, the service provider may communicate the results of the verification and validation tests to the manufacturer, which can then provide the consumer with feedback as to the genuineness of the unit, or if doubt exists, contact the user or direct the user to contact a representative of the manufacturer.

An advantage of this latter business model is that generation and validation of identification codes can be kept in greater secrecy by a single service provider than if the generating and validating computer code is in the hands of many different manufacturers and thus susceptible to being illegally copied and studied by counterfeiters seeking to "break" or corrupt the anti-counterfeit system.

Programmed Embodiments

Some or all aspects of the invention may be implemented in hardware or software, or a combination of both (e.g., programmable logic arrays). Unless otherwise specified, the algorithms included as part of the invention are not inherently related to any particular computer or other apparatus. In particular, various general purpose computing machines may be used with programs written in accordance with the teachings herein, or it may be more convenient to use a special purpose computer or special-purpose hardware (such as integrated circuits) to perform particular functions. Thus, the invention may be implemented in one or more computer programs executing on one or more programmed or programmable computer systems (which may be of various architectures, such as distributed, client/server, or grid) each comprising at least one processor, at least one data storage system (which may include volatile and non-volatile memory and/or storage elements), at least one input device or port, and at least one output device or port. Program code is applied to input data to perform the functions described herein and generate output information. The output information is applied to one or more output devices, in known fashion.

Each such computer program may be implemented in any desired computer language (including machine, assembly, or high level procedural, logical, or object oriented programming languages) to communicate with a computer system, and may be implemented in a distributed manner in which different parts of the computation specified by the software are performed by different computers. In any case, the language may be a compiled or interpreted language. Computer programs implementing some or all of the invention may form one or more modules of a larger program or system of programs. Some or all of the elements of the computer program can be implemented as data structures stored in a computer readable medium or other organized data conforming to a data model stored in a data repository.

Each such computer program may be stored on or downloaded to (for example, by being encoded in a propagated signal and delivered over a communication medium such as a network) a tangible, non-transitory storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. It is to be understood that various modifications may be made without departing from the spirit and scope of the invention. For example, some of the steps described above may be order independent, and thus can be performed in an order different from that described. It is to be understood that the foregoing description is intended to illustrate and not to limit the scope of the invention, which is defined by the scope of the following claims, and that other embodiments are within the scope of the claims.

What is claimed is:

1. An anti-counterfeiting method, including the steps of:
   (a) generating an identification code;
   (b) storing the generated identification code in a computer database;
   (c) storing a default status associated with the generated identification code;
   (d) affixing a machine readable form of the generated identification code to a unit of an item;
   (e) initially scanning the affixed identification code in close proximity to the time of affixation of the identification code on the unit;
   (f) verifying that the initially scanned affixed identification code corresponds to the stored generated identification code in the computer database;
   (g) associating, upon such verification, a selected status with the initially scanned affixed identification code, the selected status being different from the associated default status for the generated identification code; and
   (h) associating unique user identification data with the affixed identification code in the computer database after transfer of the unit having the affixed identification code to a user.

2. The method of claim 1, further including the steps of:
   (a) receiving a subsequent scan value of the affixed identification code of a unit and unique user identification data;
   (b) verifying that the scan value has a corresponding generated identification code stored in the computer database and that the received unique user identification data is associated with such affixed identification code;
   (c) determining, upon such verification, that the corresponding stored generated identification code in the computer database is associated with the selected status;
   (d) indicating an authentic status for the unit if the scan value corresponds to a stored generated identification code and if the stored generated identification code is associated with the selected status; and
   (e) indicating a fake status for the unit if the scan value does not correspond to a stored generated identification code or if the stored generated identification is not associated with the selected status.

3. The method of claim 2, wherein the user identification data includes geographic location information, and further including the steps of:
   (a) comparing received geographic location information to stored geographic location information data corresponding to previously received scan values of the affixed identification code of the unit;
   (b) indicating the authentic status for the unit if the received geographic location information is consistent with the stored geographic location information data; and
   (c) indicating the fake status for the unit if the received geographic location information is inconsistent with the stored geographic location information data.

4. The method of claim 1, wherein the identification code is a hash code.

5. The method of claim 4, wherein the hash code is an encrypted hash code.

6. The method of claim 4, wherein the hash code is generated from data associated with at least one unit of the item.

7. The method of claim 1, wherein the machine readable form of the affixed identification code is an optically readable code.

8. An anti-counterfeiting system, including:
   (a) means for generating an identification code;
   (b) means for storing the generated identification code in a computer database;
   (c) means for storing a default status associated with the generated identification code;
   (d) means for affixing a machine readable form of the generated identification code to a unit of an item;
   (e) means for initially scanning the affixed identification code in close proximity to the time of affixation of the identification code on the unit;
   (f) means for verifying that the initially scanned affixed identification code corresponds to the stored generated identification code in the computer database;
   (g) means for associating, upon such verification, a selected status with the initially scanned affixed identification code, the selected status being different from the associated default status for the generated identification code; and
   (h) means for associating unique user identification data with the affixed identification code in the computer database after transfer of the unit having the affixed identification code to a user.

9. The system of claim 8, further including:
   (a) means for receiving a subsequent scan value of the affixed identification code of a unit and unique user identification data;
   (b) means for verifying that the scan value has a corresponding generated identification code stored in the computer database and that the received unique user identification data is associated with such affixed identification code;
   (c) means for determining, upon such verification, that the corresponding stored generated identification code in the computer database is associated with the selected status;
   (d) means for indicating an authentic status for the unit if the scan value corresponds to a stored generated identification code and if the stored generated identification code is associated with the selected status; and
   (e) means for indicating a fake status for the unit if the scan value does not correspond to a stored generated identification code or if the stored generated identification is not associated with the selected status.

10. The system of claim 9, wherein the user identification data includes geographic location information, and further including:
    (a) means for comparing received geographic location information to stored geographic location information data corresponding to previously received scan values of the affixed identification code of the unit;
    (b) means for indicating the authentic status for the unit if the received geographic location information is consistent with the stored geographic location information data; and
    (c) means for indicating the fake status for the unit if the received geographic location information is inconsistent with the stored geographic location information data.

11. The system of claim 8, wherein the identification code is a hash code.

12. The system of claim 11, wherein the hash code is an encrypted hash code.

13. The system of claim 11, wherein the hash code is generated from data associated with at least one unit of the item.

14. The system of claim 8, wherein the machine readable form of the affixed identification code is an optically readable code.

15. Software stored on a tangible, non-transitory computer-readable medium for implementing an anti-counterfeiting system, the software including instructions for causing a computing system to:
   (a) generate an identification code;
   (b) store the generated identification code in a computer database;
   (c) store a default status associated with the generated identification code;
   (d) receive data representing a scan of a machine readable form of the generated identification code affixed to a unit of an item;
   (e) verify that the received data corresponds to the stored generated identification code in the computer database;
   (f) associate, upon such verification, a selected status with the received data, the selected status being different from the associated default status for the generated identification code; and
   (g) associate unique user identification data with the affixed identification code in the computer database after transfer of the unit having the affixed identification code to a user.

16. The software stored on a tangible, non-transitory computer-readable medium of claim 15, further including instructions for causing a computing system to:
   (a) receive a subsequent scan value of the affixed identification code of a unit and unique user identification data;
   (b) verify that the scan value has a corresponding generated identification code stored in the computer database and that the received unique user identification data is associated with such affixed identification code;
   (c) determine, upon such verification, that the corresponding stored generated identification code in the computer database is associated with the selected status;
   (d) indicate an authentic status for the unit if the scan value corresponds to a stored generated identification code and if the stored generated identification code is associated with the selected status; and
   (e) indicate a fake status for the unit if the scan value does not correspond to a stored generated identification code or if the stored generated identification is not associated with the selected status.

17. The software stored on a tangible, non-transitory computer-readable medium of claim 16, wherein the user identification data includes geographic location information, and further including instructions for causing a computing system to:
   (a) compare received geographic location information to stored geographic location information data corresponding to previously received scan values of the affixed identification code of the unit;
   (b) indicate the authentic status for the unit if the received geographic location information is consistent with the stored geographic location information data; and
   (c) indicate the fake status for the unit if the received geographic location information is inconsistent with the stored geographic location information data.

18. The software stored on a tangible, non-transitory computer-readable medium of claim 15, wherein the identification code is a hash code.

19. The software stored on a tangible, non-transitory computer-readable medium of claim 18, wherein the hash code is an encrypted hash code.

20. The software stored on a tangible, non-transitory computer-readable medium of claim 18, wherein the hash code is generated from data associated with at least one unit of the item.

21. The software stored on a tangible, non-transitory computer-readable medium of claim 15, wherein the machine readable form of the affixed identification code is an optically readable code.

* * * * *